United States Patent [19]
Hough

[11] Patent Number: 5,931,922
[45] Date of Patent: Aug. 3, 1999

[54] MEDIA SERVER SYSTEM FOR PREVENTING FIFO BUFFER UNDERFLOW DURING MULTIPLE CHANNEL STARTUP BY WAITING UNTIL BUFFER RECEIVES PLURALITY OF DATA BLOCKS BEFORE ENABLING BUFFER TO TRANSMIT RECEIVED DATA

[75] Inventor: James K. Hough, Mountain View, Calif.

[73] Assignee: Sun Microsystems, Inc., Palo Alto, Calif.

[21] Appl. No.: 08/673,583

[22] Filed: Jul. 1, 1996

[51] Int. Cl.$^6$ .............................. G06F 12/06; G06F 13/14; H04N 7/10

[52] U.S. Cl. ................................ 710/34; 710/33; 710/52; 395/500; 348/390; 348/419; 358/404

[58] Field of Search ............................ 358/404; 348/419, 348/390; 710/33, 52, 34; 395/500

[56] References Cited

U.S. PATENT DOCUMENTS

| | | | |
|---|---|---|---|
| 5,363,138 | 11/1994 | Hayashi et al. | 348/390 |
| 5,584,041 | 12/1996 | Odawara et al. | 395/834 |
| 5,600,366 | 2/1997 | Schulman | 348/9 |
| 5,619,341 | 4/1997 | Auyeung et al. | 358/404 |
| 5,644,787 | 7/1997 | Nakamura et al. | 395/853 |

OTHER PUBLICATIONS

"Buffer Management for Video Database Systems", Rotem et al, IEEE, pp. 439–448, Feb. 1995.
"A Multimedia Storage System for On–Demand Playback", Oyang et al, IEEE, pp. 53–64, Mar. 1995.

*Primary Examiner*—Thomas C. Lee
*Assistant Examiner*—Rehana Perveen
*Attorney, Agent, or Firm*—Conley, Rose & Tayon; Robert C. Kowert; B. Noel Kivlin

[57] ABSTRACT

A media server system and method for reducing the probability of data starvation or underflow in a media server system. The media server system preferably comprises a video server computer system which stores a plurality of encoded data streams, wherein the computer system is coupled through a SCSI (Small Computer Systems Interface) bus to one or more MPEG decoder blocks. The media server system thus utilizes a single control channel for multiple video channels. The present invention operates to fill the FIFO buffer of a channel to a higher level during startup, thus reducing the probability of data underflow. In one embodiment, the host computer or server begins data transmission prior to sending the "play" function or play command in order to pre-fill or pre-load the buffer. In another embodiment where the host server is not configured to pre-load the buffer prior to issuing the play command, the MPEG decoder block disables the FIFO buffer when the play command is received. The MPEG decoder block then receives and stores data in the buffer to pre-fill the buffer, and then enables the FIFO to begin transfers. The present invention thus pre-loads the FIFO buffer to prevent underflow problems associated with the start-up of multiple data streams.

10 Claims, 8 Drawing Sheets

MEDIA SERVER SYSTEM FOR PREVENTING FIFO BUFFER UNDERFLOW DURING MULTIPLE CHANNEL STARTUP BY WAITING UNTIL BUFFER RECEIVES PLURALITY OF DATA BLOCKS BEFORE ENABLING BUFFER TO TRANSMIT RECEIVED DATA

FIELD OF THE INVENTION

The present invention relates to media server and/or video server systems, and more particularly to a media server system comprising a video server coupled through a SCSI bus to one or more MPEG decoder blocks, wherein the system pre-fills data buffers at start-up to prevent buffer underflow.

DESCRIPTION OF THE RELATED ART

Video-on-demand or video delivery systems enable a plurality of subscribers or users to selectively watch movies or other audio/video sequences which are stored on one or more video servers or media servers. The video servers are connected through data transfer channels to the plurality of subscribers or users. The video servers store a plurality of movies or other audio/video sequences, and each user can select one or more movies from the video servers for viewing. Each user includes a television or other viewing device, as well as associated decoding logic, for selecting and viewing desired movies. When a user selects a movie, the selected movie is transferred on one of the data transfer channels to the television of the respective user.

Full-motion digital video requires a large amount of storage and data transfer bandwidth. Thus, video-on-demand systems use various types of video compression algorithms to reduce the amount of necessary storage and data transfer bandwidth. Current video-on-demand systems use MPEG or MPEG-2 encoding in order to reduce the required data transfer bandwidth. Thus, audiovisual sequences, such as movies or other content, are stored on the media server in an MPEG compressed format, and the audiovisual sequence is decoded and typically converted to analog format for display and/or transmission to a user.

One type of media server design comprises a video server computer system which stores a plurality of encoded data streams, wherein this computer system is coupled through a SCSI (Small Computer Systems Interface) bus to one or more MPEG decoder blocks. Each of the MPEG decoder blocks are in turn coupled to video encoders and/or codecs (coder/decoders) for producing analog baseband data. Respective modulators may also be provided for modulating the data with a carrier frequency to produce band pass signals, such as UHF or VHF signals, or cable TV signals.

Media servers which utilize a SCSI bus to communicate to multiple MPEG decode channels utilize a single control channel for multiple video channels. The firmware overhead involved with beginning the transfer of video data on one or more channels may lead to data starvation of an existing channel. In other words, a buffer which is transferring data to an MPEG channel may run out of data due to the overhead associated with other channels. This may result in an undesirable interruption of the play of a multimedia stream. Therefore, a system and method is desired to reduce the probability of data starvation or underflow in a media server system.

SUMMARY OF THE INVENTION

The present invention comprises a media server system and method for reducing the probability of data starvation or underflow in a media server system. The media server system preferably comprises a video server computer system which stores a plurality of encoded data streams, wherein the computer system is coupled through a SCSI (Small Computer Systems Interface) bus to one or more MPEG decoder blocks. The media server system thus utilizes a single control channel for multiple video channels. As discussed above, the firmware overhead involved with starting channels can sometimes lead to data starvation of an existing channel. The present invention operates to fill the FIFO buffer of a channel to a higher level only during startup, thus reducing the probability of data underflow.

According to the invention, the host computer or server begins data transmission prior to sending the "play" function or play command. The number of blocks is calculated based on block size to prevent overflowing the buffer. In this embodiment, the MPEG decoder block is configured to not begin emptying the FIFO until the play function is decoded. After the pre-determined number of blocks have been transferred or issued, the play function is sent. This signals the firmware executing on the MPEG decoder block to enable the FIFO for transfer to the decoder. All subsequent transfers proceed normally.

In another embodiment where the host server is not configured to pre-load the buffer prior to issuing the play command, the firmware executing on the MPEG decoder block sets a flag to disable the FIFO buffer when the play command is received. The MPEG decoder also initiates a predetermined buffer block counter when the play command is received. As data blocks are received for the respective channel, the MPEG decoder decrements the block counter. The buffer block counter counts a predetermined number of blocks of received data based on worst case block size and buffer capacity. When the count expires, the MPEG decoder resets the play flag and enables the FIFO to begin transfers. Once the play flag is reset, all subsequent blocks proceed normally.

Therefore, the present invention pre-loads the FIFO buffer to prevent underflow problems associated with the start-up of multiple data streams. In one embodiment, the host server transfers a calculated number of SCSI blocks and used uses the "play" function or play command to terminate the preload process. In a second embodiment, where the host is not configured for the pre-load option, firmware in the target device detects the beginning of a transfer and use a block counter to control the pre-load process prior to execution of the play command.

BRIEF DESCRIPTION OF THE DRAWINGS

A better understanding of the present invention can be obtained when the following detailed description of the preferred embodiment is considered in conjunction with the following drawings in which.

Figure 1:
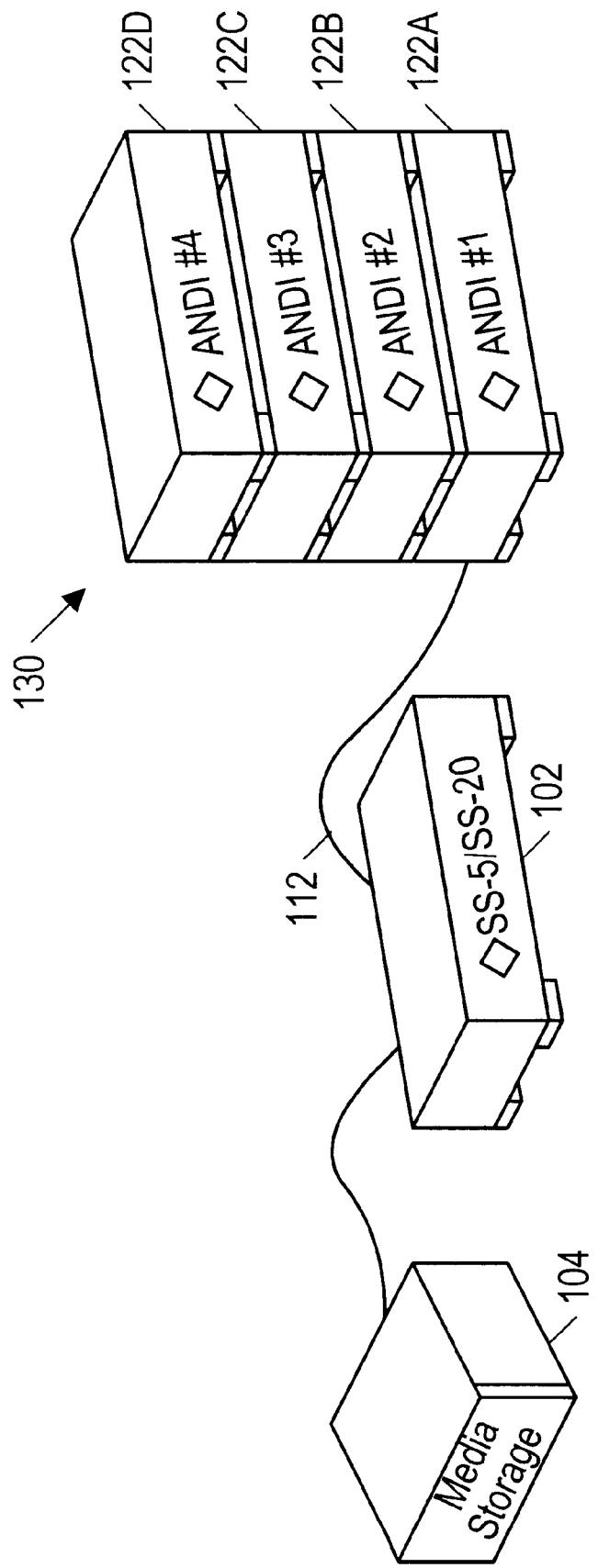
FIG. 1 illustrates a media server system according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary the intention is to cover all modifications equivalents and alternatives solely within the spirit and scope of the present invention, as defined by the appended claims.

DETAILED DESCRIPTION OF THE PREFERRED EMBODIMENT

Referring now to FIG. 1, a diagram illustrating the media server system according to one embodiment of the present invention is shown. As shown, the media server system includes a computer system unit 102. The computer system unit 102 is preferably the Sun SS-5 or Sun SS-20 computer produced by Sun Microsystems, and is preferably based on the UltraSparc processor. The computer system unit 102 may include one or more various types of storage devices including a RAID (redundant array of inexpensive disks) disk array, one or more digital video disks, or other memory or media storage as desired. Alternatively, or in addition, the computer system unit 102 may couple to a disk array storage device 104, as shown. The computer system 102 may also include a monitor (not shown).

The various media storage devices comprised in the computer system unit 102 or coupled to the system unit 102 preferably store compressed data streams. In the preferred embodiment, the data streams are MPEG-2 compressed streams. However, it is noted that any of various types of data or video compression may be used as desired.

The computer system unit 102 couples to one or more MPEG decoder boxes 122 as shown. In the embodiment shown, the computer system unit 102 couples to four MPEG decoder boxes 122A–122D. Each MPEG decoder box 122 preferably comprises 6 MPEG channels. The group of four MPEG decoder boxes 122A–122D collectively comprises a 24 channel decoder box 130. As shown, the MPEG decoder boxes 122A–122D are preferably configured in a rack mounted configuration, wherein the plurality of MPEG decoder boxes are mounted one on top of each other. The MPEG decoder boxes 122 are preferably connected in a daisy chained manner.

The computer system unit 102 preferably couples to a first one of the respective MPEG decoder boxes 122A through the Small Computer Systems Interface (SCSI) bus or cable 112. As is well known, the SCSI bus is a peripheral device bus wherein a plurality of devices may be connected to the bus in a daisy chained manner. The SCSI bus may be the Fast SCSI bus or the Wide SCSI bus or a Fast/Wide SCSI bus, as is well known in the art. As shown, the computer system unit 102 couples to a first MPEG decoder box 122A, and the remaining MPEG decoder boxes are in turn in turn daisy chained together. The computer system 102 includes a SCSI host adapter (not shown) which couples through a SCSI cable to the MPEG decoder box 122A.

Figure 2:
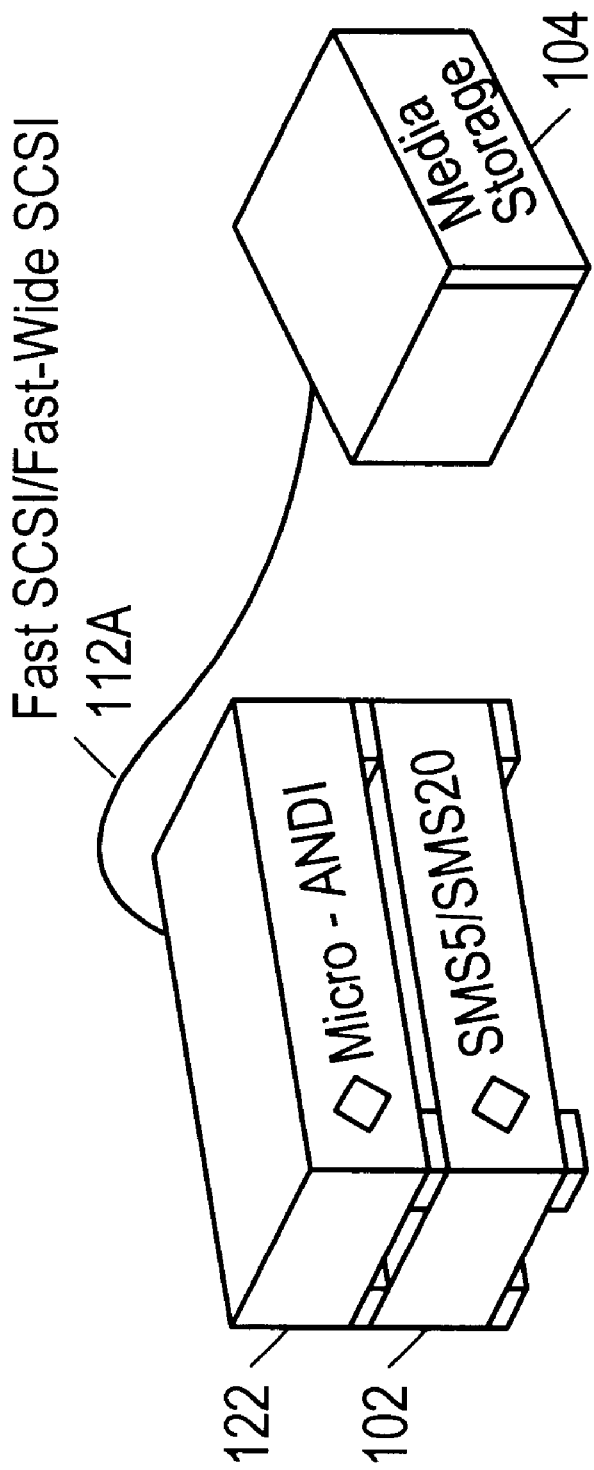
FIG. 2 illustrates a media server system according to another embodiment of the invention.

Referring now to FIG. 2, an alternate embodiment of the media server system is shown. In the embodiment of FIG. 2, a single MPEG decoder 122 is connected to the media server system unit 102. The single MPEG decoder 122 and the media server system unit 102 are preferably physically configured in a rack mounted configuration. Although not shown in FIG. 2, the MPEG decoder 122 couples to the media server system unit 102 through a SCSI connection or SCSI cable. The media server system unit 102 may in turn couple to a disk array media storage unit 104 or other type of storage unit, preferably through a Fast SCSI bus, or Fast-Wide SCSI bus cable 112A, as shown.

Figure 3:
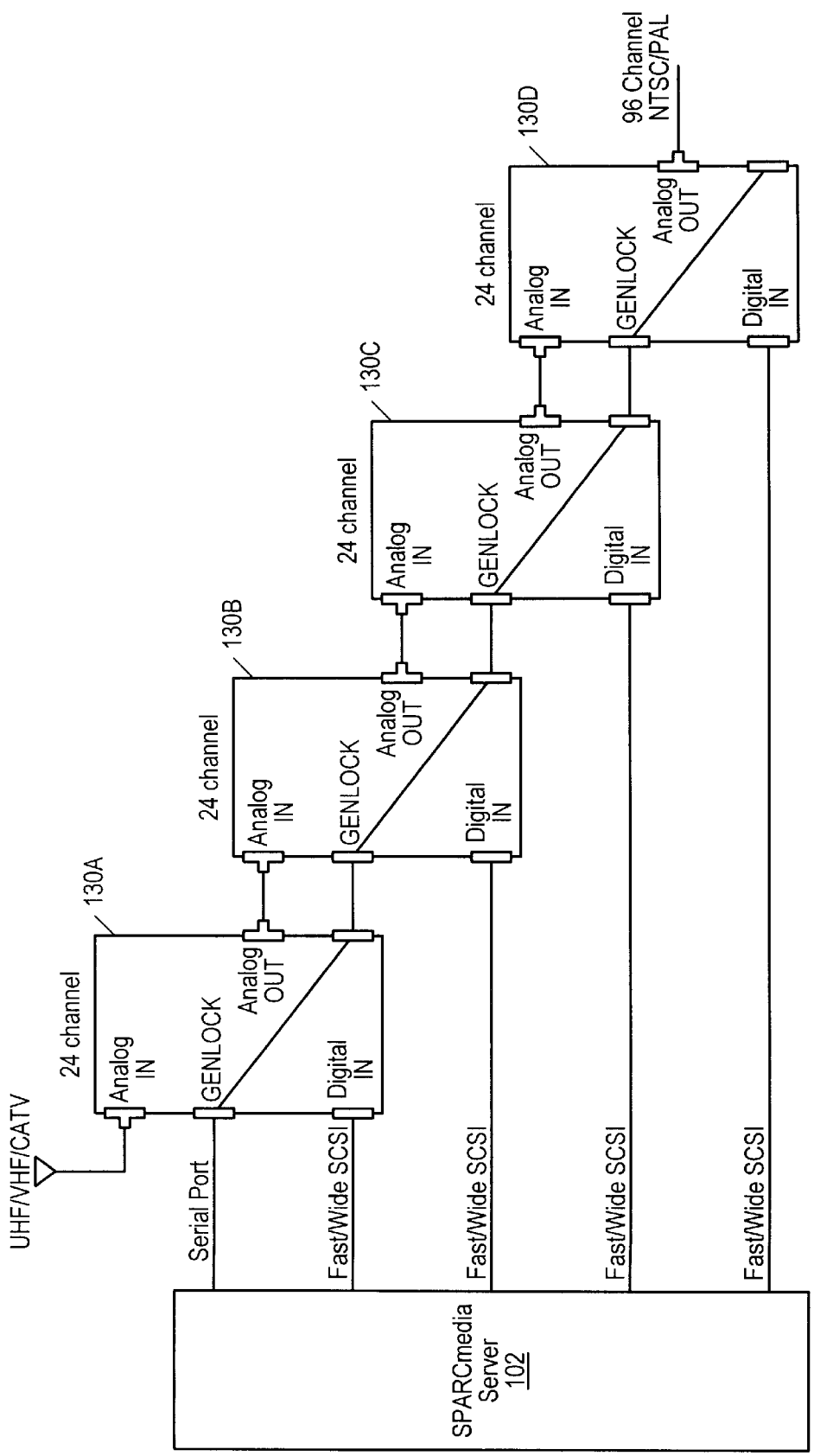
FIG. 3 illustrates a media server system which includes a plurality of 24 channel MPEG decoder units forming a 96 channel system.

Referring now to FIG. 3, a block diagram illustrating a media server system according to another embodiment is shown. This embodiment includes four 24 channel MPEG decoder units 130 labeled 130A–130D. In FIG. 3, each of the 24 channel MPEG decoder units 130 comprise the four MPEG decoder boxes 122A–122D connected or daisy chained together as shown in FIG. 1. In the embodiment of FIG. 3, four 24 channel MPEG decoder units 130 are daisy chained together to produce a 96 channel system. Thus, the embodiment of FIG. 3 comprises 16 MPEG decoder boxes 122.

As shown in FIG. 3, in this embodiment the media server system unit 102 includes a plurality of output ports, preferably four output ports, which provide Fast/Wide SCSI bus connectivity. Each of the SCSI bus connector ports is adapted to couple to a digital input of one of the respective 24 channel MPEG decoder units 130A–130D as shown. As shown, the media server system unit 102 also includes a serial output port which couples to an input port of one of the respective MPEG decoder units 130A. The respective MPEG decoder unit 130A which receives the serial output from the media server system unit 102 includes an analog output which is provided to a corresponding analog input of a subsequent MPEG decoder unit 130B. This respective MPEG decoder unit 130B in turn provides an analog output to an analog input of a subsequent MPEG decoder unit 130C. Finally, the MPEG decoder unit 130C provides a corresponding analog output to an analog input of the last MPEG decoder unit 130D. Thus, each of the MPEG decoder units 130A–D are daisy chained together through the serial output of the media server system unit 102. The last MPEG decoder unit 130D in the daisy chain provides a 96 channel output, i.e., an output signal which comprises up to 96 video streams or channels of video or audiovisual content, including television programming content.

The analog output of the MPEG decoder unit 130D may be comprised in various formats. In one embodiment, the analog output conforms to the National Television Standards Committee (NTSC) standard for analog video. In an alternate embodiment, the analog output corresponds to the European PAL format.

As shown in FIG. 3, the first MPEG decoder unit 130A also preferably includes an analog input port for receiving an analog input signal. As shown, this analog input signal may comprise a UHF or VHF signal, or a cable TV signal.

Figure 4:
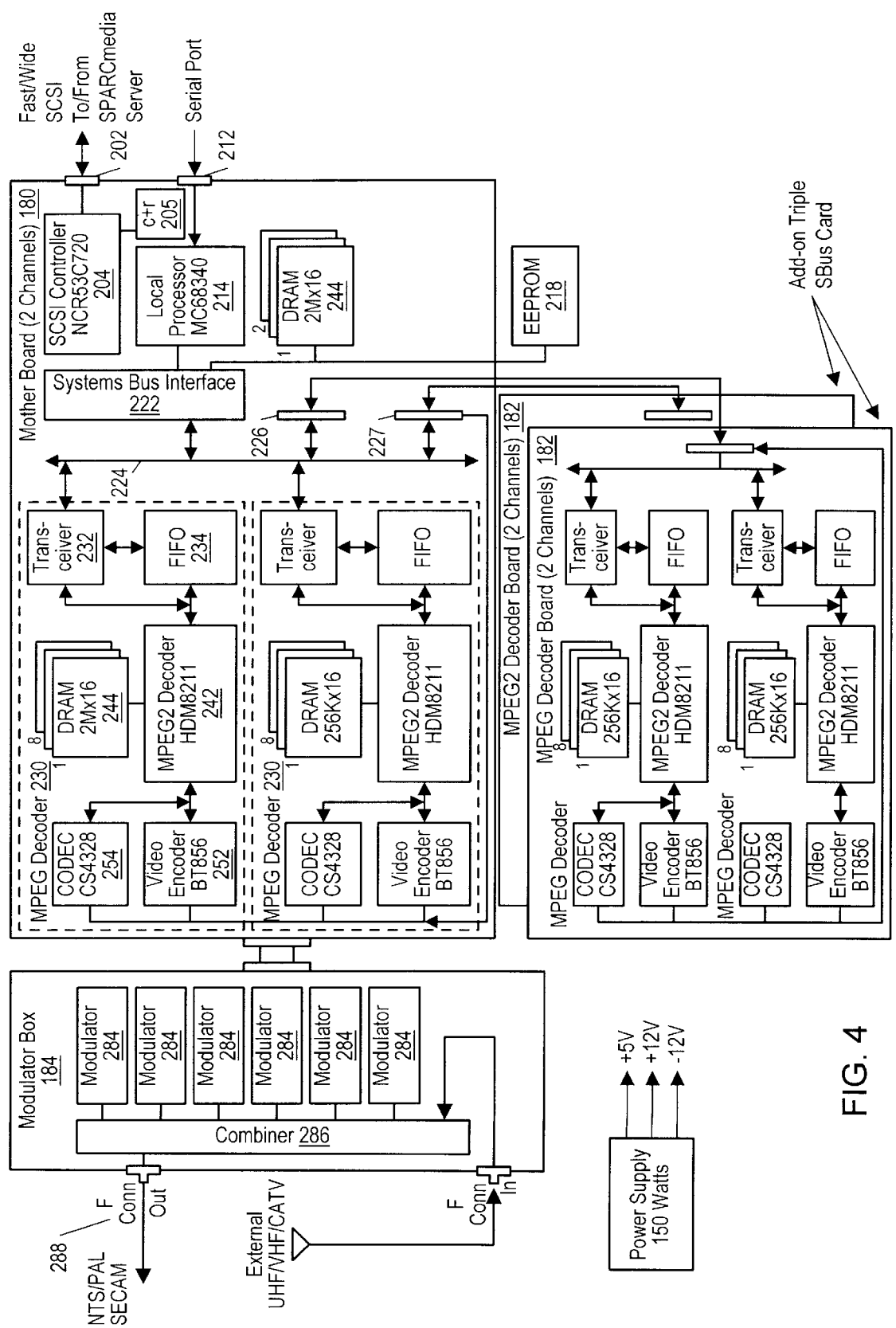
FIG. 4 is a block diagram illustrating the MPEG decoder box of FIG. 1.

FIG. 4—MPEG Decoder Box Block Diagram

Referring now to FIG. 4, a block diagram illustrating one of the MPEG decoder boxes 122 is shown. As shown, each MPEG decoder box 122 includes an MPEG decoder board 180. The MPEG decoder board 180 includes two expansion slots 226 and 227 for receiving up to two MPEG decoder daughter cards 182. The MPEG decoder board 180 includes two MPEG channels, as shown. Each MPEG decoder daughter card 182 also includes two MPEG channels. Thus, when two MPEG decoder daughter cards 182 are inserted in the respective slots 226 and 227 of the MPEG decoder board 180, the MPEG decoder box 122 comprises 6 MPEG channels. The MPEG decoder box 122 also includes a modulator box 184 which is coupled to an output of the MPEG decoder board 180. The output of the MPEG decoder board 180 is a baseband signal. The modulator box 184 converts the output baseband signal to a passband signal, such as a UHF, VHF or cable TV signal.

Each MPEG decoder board 180 includes an input/output (I/O) port 202 for coupling to a SCSI bus. As noted above, in the preferred embodiment each MPEG decoder box 122 is adapted for coupling to a Fast/Wide SCSI bus. As also noted above, the SCSI bus I/O port is preferably used to couple through a SCSI bus to a respective media server system unit 102. The SCSI I/O port 202 couples to a SCSI controller 204. In the preferred embodiment, the SCSI controller is the NCR53C720 SCSI Controller produced by National Cash Register (NCR). A counter 205 is coupled to the SCSI controller 204.

Each MPEG decoder box 122 also includes a serial port input for receiving serial data. The respective serial port input 212 couples to a local processor 214. In the preferred embodiment, the local processor 214 is the MC68340 processor produced by Motorola Corporation.

The SCSI controller 204 and the local processor 214 couple to a system bus interface 222. A memory, preferably dynamic random access memory (DRAM) 216, couples to the system bus interface 222. The DRAM is preferably 512K×16. A non-volatile memory 218, preferably an EEPROM (electrically erasable programmable ROM), is also coupled to the system bus interface 222. The EEPROM 218 stores firmware which controls the operation of the SCSI controller 204 according to the present invention. At power on, the firmware stored in the EEPROM 218 is loaded into the DRAM 216, and the firmware is then executed by the SCSI controller 204 from the DRAM 216. As discussed below, the firmware directs the SCSI controller 204 to pre-fill or pre-load a buffer in the MPEG decoder board 180 in order to prevent an underflow or starvation situation.

The system bus interface 222 couples to a bus 224 as shown. The two MPEG decoder daughter card slots 226 and 227 are coupled to the bus 224. The bus is preferably the S-bus, but other bus types may be used. Two MPEG decoder logic blocks 230 are coupled to the bus 224. The MPEG decoder logic blocks 230 are preferably identical, and only one is described below for convenience.

As shown, each MPEG decoder logic block 230 includes a first transceiver 232 coupled to the system bus 224. A first in first out (FIFO) buffer 234 couples to the transceiver 232. Each of the transceiver 232 and FIFO buffer 234 couple to an MPEG-2 decoder block 242. A memory block 244, preferably 2M×16 DRAM, couples to the MPEG-2 decoder block 242. The MPEG-2 decoder block 242 is preferably the HDM8211.

The FIFO buffer 234 receives and stores data received from the media server 102. The FIFO buffer 234 is used to store data prior to being sent to the MPEG decoder block 242. According to the present invention, the media server 102 and/or the MPEG decoder box 122 operate to pre-fill or pre-load the buffer 234 to prevent an underflow situation from occurring, as described below.

The MPEG-2 decoder block 242 couples to a video encoder 252. The video encoder 252 includes analog to digital conversion logic and produces a baseband analog video signal. The MPEG-2 decoder block 242 also couples to a coder/decoder (codec) 254, which converts the digital audio portion of the decoded MPEG signal to analog audio signals. Each of the video encoder 252 and codec 254 are coupled through a bus to an input/output port 262 of the MPEG decoder board 180.

As mentioned above, one or more MPEG-2 decoder daughter cards 182 may be coupled to the system bus 224 for providing two to four additional stream processing channels. As shown, each MPEG-2 decoder daughter card 182 comprises two MPEG decoder logic blocks 230, as described above.

The analog I/O port 262 of the MPEG decoder board 180 preferably outputs a baseband analog signal comprising a plurality of data streams or channels. In the preferred embodiment of the invention, a modulator box 184 is coupled to the I/O outport 262 for converting the baseband analog signal to a passband analog signal. As shown, the modulator box 184 comprises a plurality of modulators 284 for each of the respective channels. Each of the modulators 284 is coupled to a combiner 286 which combines the modulated systems into a single analog signal, such as a VHF or UHF signal, comprising a plurality of channels. The combiner 286 provides an output through a connector 288 which may conform to any of various formats, including the NTSC format, the PAL format, or the SECAM format.

As shown, the modulator box 184 also includes an input for optionally receiving a UHF, VHF or cable TV signal. The analog input is provided to the combiner 286 and is provided as a portion of the analog output from the I/O port 288.

Figure 5:
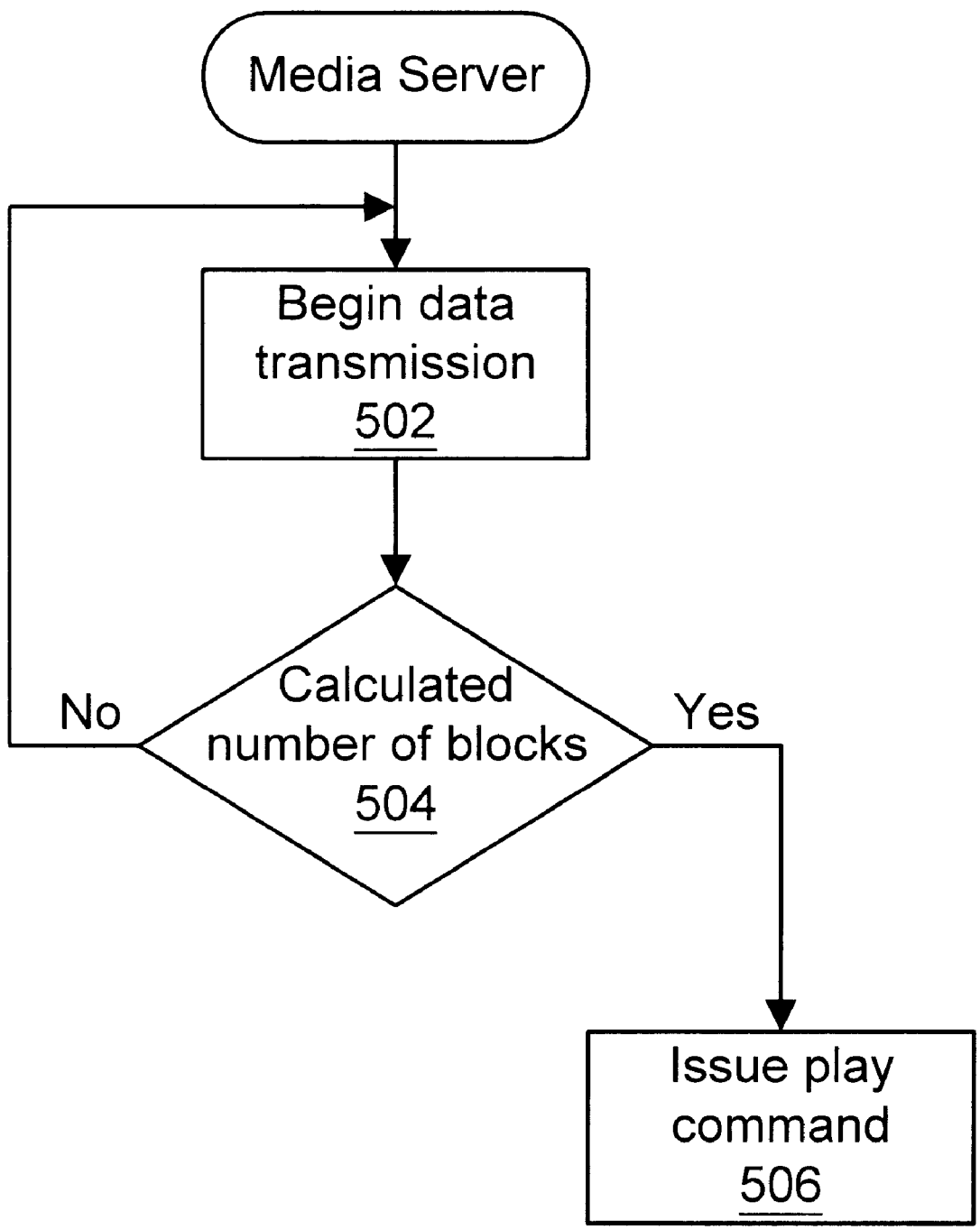
FIGS. 5 and 6 are flowchart diagrams illustrating operation of the media server computer system and MPEG decoder, respectively, wherein the media server pre-loads the MPEG decoder buffer prior to issuing a Play command.
Figure 6:
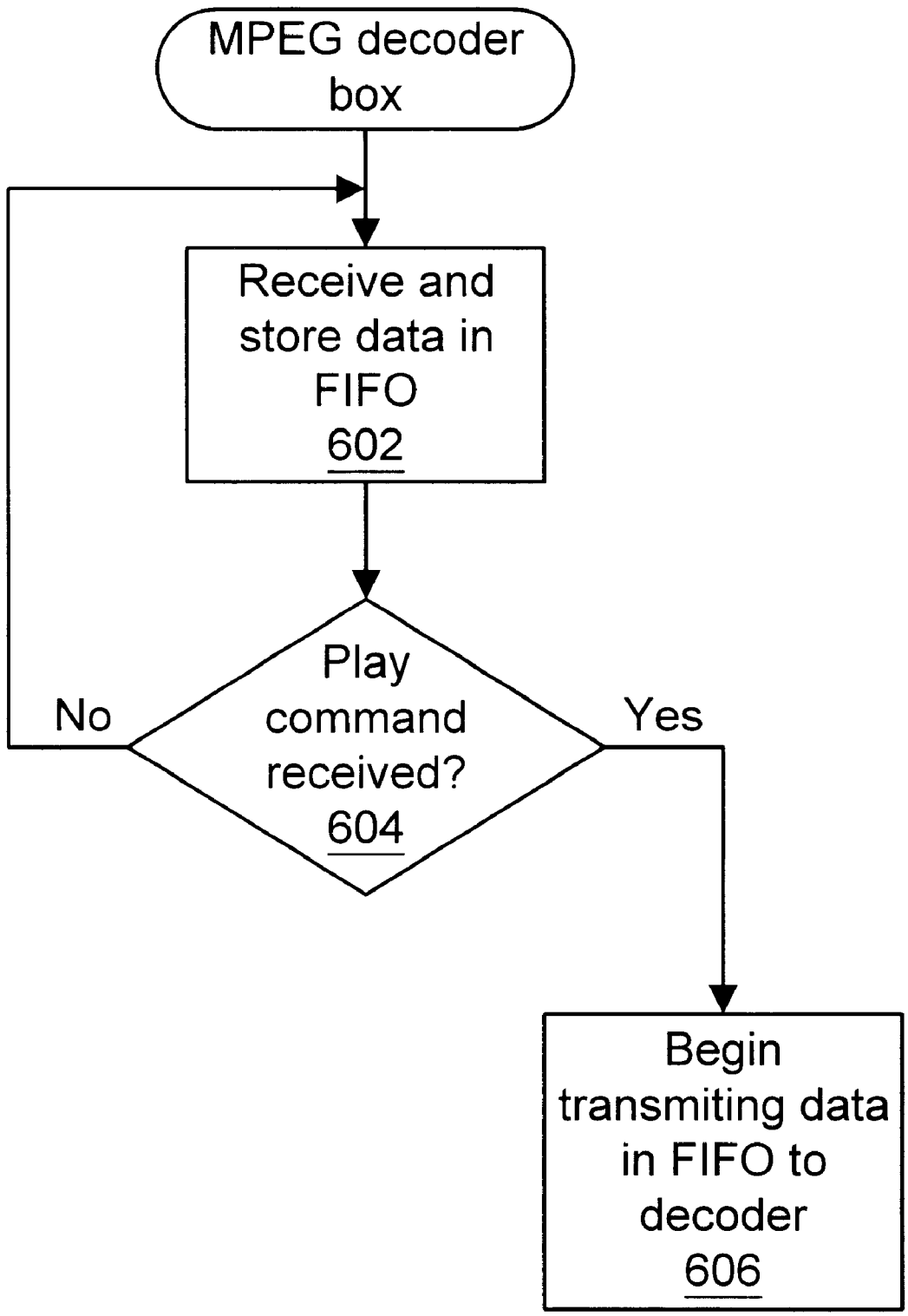

FIGS. 5 and 6—Media Server Pre-loads Buffer

Referring now to FIGS. 5 and 6, flowchart diagrams illustrating operation of the present invention according to a first embodiment is shown. In this embodiment, the host server or computer system is configured to perform pre-loading according to the present invention in order to prevent data transfer underflow associated with the startup of transfer of multiple data streams. FIG. 5 illustrates operation of the media server 102, and FIG. 6 illustrates operation of one of the MPEG decoder boxes 122.

Referring now to FIG. 5, in this embodiment the host server 102 first begins a data transmission in step 502. It is noted here that the video server 102 begins data transmission of one or more streams prior to sending the "play" command. In step 502 the video server 102 transfers a pre-determined number of blocks in order to pre-fill or pre-load the FIFO buffer 234. The number of blocks transferred in step 502 is preferably calculated based on block size to prevent overflow of the buffer 234.

After the calculated or pre-determined number of blocks have been transferred in step 502, as determined in step 504, in step 506 the media server 102 issues the play command. Thus, in this embodiment, the media server 102 only issues the play command after the FIFO buffer 234 has been filled with sufficient data to prevent an underflow or starvation situation from occurring. In the preferred embodiment, the media server 102 operates to substantially fill the buffer 234 prior to issuing the play command. In the preferred embodiment, the FIFO buffer 234 is substantially filled when the buffer 234 is more than 90% filled with data.

Referring now to FIG. 6, a flowchart diagram illustrating operation of an MPEG decoder box 122 according to the first embodiment of the present invention is shown. FIG. 6 illustrates operation of the MPEG decoder box 122 according to the media server operation shown in FIG. 5. As shown, in step 602 the MPEG decoder box 122 receives and stores data in its FIFO buffer 234. In other words, data is received at the input port 202 of the MPEG decoder box 122 and stored in the buffer 234. As shown, this operation continues until a play command is received.

When a play command is determined to be received in step 604, then in step 606 the MPEG decoder box 122 enables transmission of data from the FIFO buffer 234 to the MPEG decoder logic 242. Thus, in this embodiment, the media server computer system 102 operates to pre-load the buffer 234 in the MPEG decoder box 122 prior to issuing a play command.

Therefore, according to this embodiment of the invention, the host computer or server begins data transmission prior to sending the play command. The number of blocks transferred is calculated based on block size to prevent overflowing the buffer. In this embodiment, the MPEG decoder box or block 122 is configured to not begin emptying the FIFO 234 until a play command is decoded.

After the pre-determined number of blocks have been transferred or issued in step 502, in step 506 the host server 102 transfers the play command or function. This signals the firmware executing on the MPEG decoder block 122 to enable the FIFO 234 to transfer data to the decoder 242. In response to receiving the play command, the SCSI controller 204 enables the FIFO 234 to begin data transfers to the MPEG decoder block 242. All subsequent transfers proceed normally.

Figure 7:
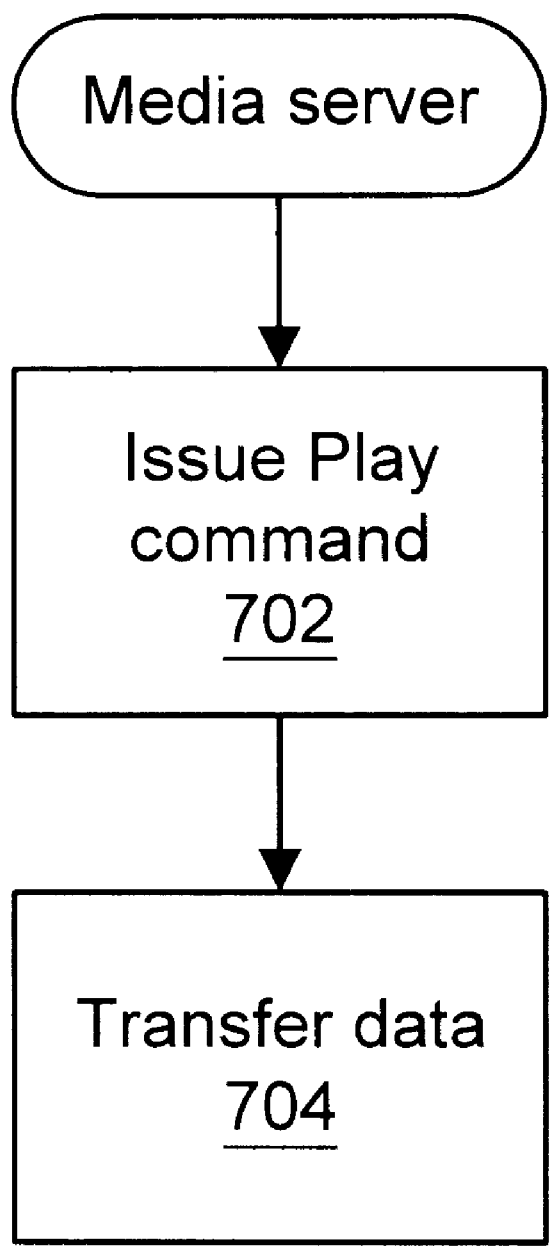
FIGS. 7 and 8 are flowchart diagrams illustrating operation of the media server computer system and MPEG decoder, respectively, wherein the media server does not pre-load the buffer prior to issuing a Play command, and the MPEG decoder operates to pre-load received data prior to enabling the buffer.
Figure 8:
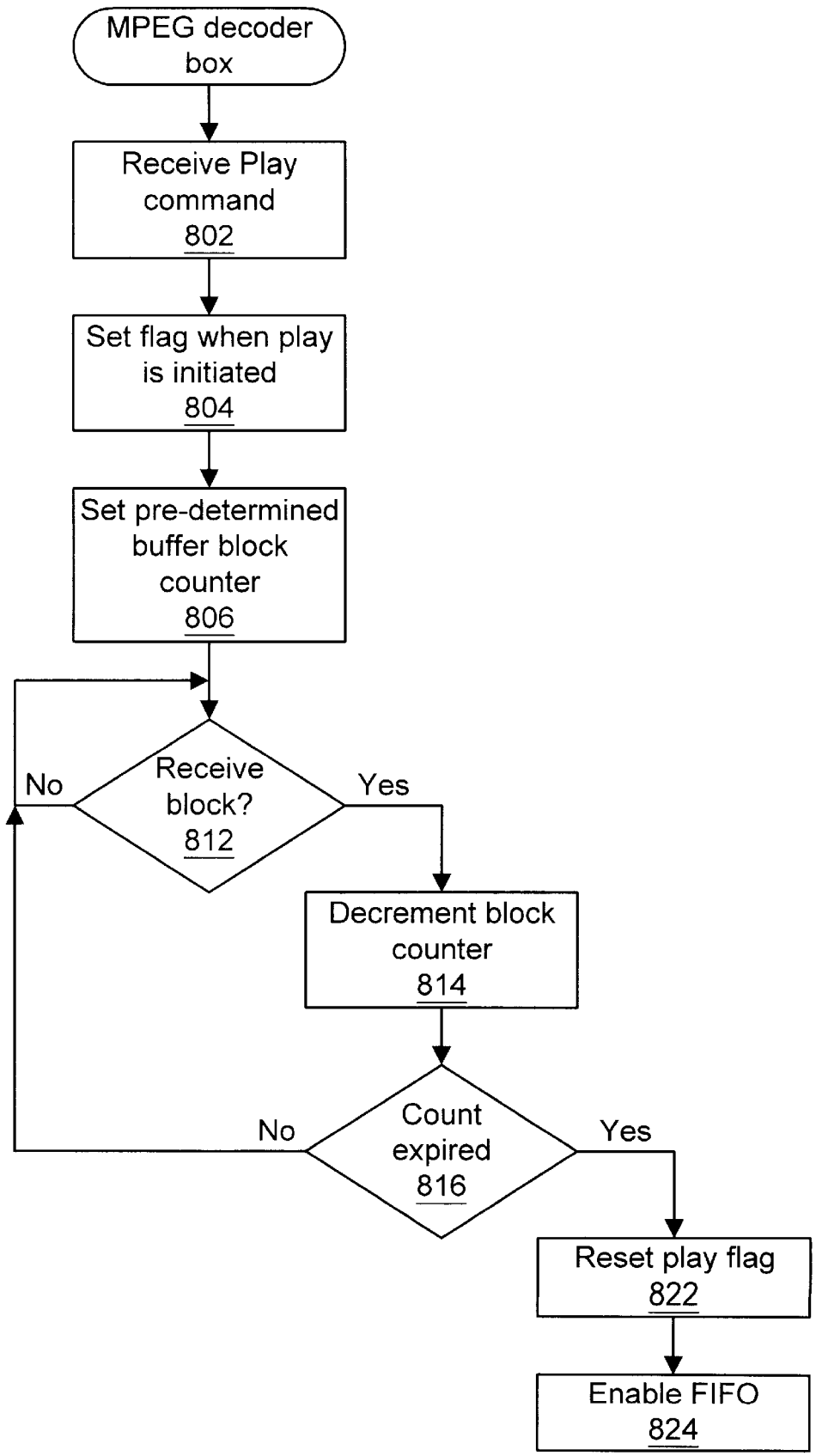

FIGS. 7 and 8—Media Server Does Not Pre-load Buffer

Referring now to FIGS. 7 and 8, flowchart diagrams illustrating operation of the present invention according to a second embodiment is shown. In this embodiment, the host server or computer system does not perform pre-loading in order to prevent data transfer underflow. Rather, in this embodiment, the MPEG decoder box 122 operates to pre-fill or pre-load its buffer 234 to prevent underflow or starvation associated with the startup of transfer of multiple data streams. FIG. 7 illustrates operation of the media server 102, and FIG. 8 illustrates operation of one of the MPEG decoder boxes 122.

Referring now to FIG. 7, in step 702 the media server 102 issues the play command. In step 704 the media server 102 begins transferring data to a respective MPEG decoder box 122. Thus in this embodiment the media server 102 begins by issuing a play command and then begins providing data blocks to the MPEG decoder box 122. In other words, in this embodiment the media server 102 is not configured according to the present invention to pre-fill the buffer 234, but rather operates according to the prior art, whereby the play command is issued first followed by the data transfer. In this embodiment, the SCSI controller 204 in the MPEG decoder box 122 is programmed according to the invention to pre-fill the buffer 234 prior to enabling operation according to the play command.

Referring now to FIG. 8, operation of the MPEG decoder box 122 according to the second embodiment of the present invention is shown. The steps in FIG. 8 are preferably executed by the SCSI controller 204 in the MPEG decoder box 122. As shown, in step 802 the MPEG decoder box 122 receives a play command from the server 102. This play command was generated by the server 102 in step 702 of FIG. 7.

In step 804 the MPEG decoder box 122 sets a flag when play is initiated, i.e., in response to the received play command. This flag directs the MPEG decoder box 122 to not begin transfers from the FIFO 234.

In step 806 the MPEG decoder box 122 sets or enables a predetermined buffer block counter 205. Thereafter, each time the MPEG decoder box 122 receives a block of data as determined in step 812, the MPEG decoder box 122 decrements the block counter 205. When the block counter 205 expires as determined in step 816, indicating that the predetermined number of blocks have been received, then in step 822 the MPEG decoder resets the play flag and in step 824 enables the FIFO 234 to proceed under normal operations. Thus, in step 824 the FIFO 234 begins transferring data to the MPEG decoder 242.

FIGS. 7 and 8 thus illustrate a second embodiment where the host server 102 is not configured to pre-load the buffer prior to issuing the "PLAY" command. In this embodiment, the firmware executing on the MPEG decoder box or block 122 disables the FIFO buffer 234 when play is initiated. The MPEG decoder box 122 also sets a predetermined buffer block counter 205 based on worst case block size and buffer capacity. As data blocks are received, the MPEG decoder box 122 decrements the block counter 205 on every received block for that channel. When the count expires, the MPEG decoder box 122 resets the play flag and enables the FIFO 234 to begin transfers. Once the play flag is reset, all subsequent blocks are transferred normally.

Therefore, the present invention comprises a system and method for preventing underflow or data starvation in a media server system. The present invention provides a first embodiment where the media server 102 intelligently pre-loads the buffer prior to issuing the play command. The present invention also includes a second embodiment where the media server 102 does not pre-load the buffer prior to issuing the play command, but rather the MPEG decoder box 122 operates to intelligently pre-load the buffer prior to acknowledging the play command.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A media server system, comprising:

a computer system including a memory media for storing multimedia data, wherein the computer system is configured to generate data transfers, wherein the computer system is configured to first issue a play command and then generate data transfers only after the play command has been issued;

one or more decoder boxes coupled to said computer system, wherein each of said one or more decoder boxes includes a plurality of data channels, wherein each of said one or more decoder boxes is adapted to receive data from said computer system, wherein each of said one or more decoder boxes comprises:

a buffer for receiving and storing data from said computer system;

a buffer block counter for counting a plurality of data blocks received and stored by said buffer, wherein said buffer block counter begins counting when said play command is received; and enabling means for enabling said buffer to transmit received data when said buffer block counter counts said plurality of data blocks, wherein said enabling means waits until said buffer block counter counts said plurality of data blocks before enabling said buffer to transmit received data to reduce the possibility of the buffer becoming empty during play of said multimedia data.

2. The media server system of claim 1, further comprising:

means for initiating said buffer block counter when said play command is received.

3. The media server system of claim 1, wherein said buffer block counter counts a first plurality of data blocks received and stored by said buffer, wherein said first plurality of data blocks are calculated to substantially fill said buffer.

4. The media server system of claim 1, further comprising:

means for setting a flag when said play command is received, wherein said flag operates to disable transfers from said buffer;

wherein said means for enabling said buffer to transmit received data comprises means for resetting said flag.

5. The media server system of claim 1, wherein said computer system includes a SCSI host adapter for coupling to a SCSI bus, wherein the computer system is configured to generate SCSI bus data transfers;

wherein the media server system further comprises a SCSI cable for connecting said computer system to said one or more decoder boxes;

wherein said one or more decoder boxes comprise SCSI devices coupled to said SCSI cable.

6. A method for transferring video data in a media server system comprising a video server, at least one decoder box comprising a plurality of channels, and a bus connecting the video server to the at least one decoder box, the method comprising:

the server reading data from a storage media;

the server issuing a play command to begin play of multimedia data;

the server transferring multimedia data to said at least one decoder box only after the play command has been issued;

said at least one decoder box receiving said play command;

said at least one decoder box receiving said multimedia data, wherein said receiving comprises storing said first plurality of data in a buffer;

said at least one decoder box counting blocks of said multimedia data as said multimedia data is received by said at least one decoder box; and waiting until said at least one decoder box has counted a first plurality of blocks of said received multimedia data before transferring data from said buffer to a data channel, wherein said transferring data from said buffer to said data channel after said at least one decoder box has counted said first plurality of blocks of said received multimedia data reduces the possibility of the buffer becoming empty during play of said multimedia data.

7. The method of claim 6, wherein said at least one decoder box counting blocks of said multimedia data is performed in response to said at least one decoder box receiving said play command.

8. The method of claim 6, wherein said buffer is substantially filled when said at least one decoder box has counted said first plurality of blocks of said received multimedia data.

9. The method of claim 6, further comprising:

said at least one decoder box setting a flag when said play command is received, wherein said flag indicates that said buffer is not enabled for transferring data; and said at least one decoder box resetting said flag to enable said transferring data from said buffer to said data channel, wherein said at least one decoder box resets said flag in response to said at least one decoder box having counted said first plurality of blocks of said received multimedia data.

10. The method of claim 6, wherein the video server couples to the at least one decoder box through a SCSI cable;

wherein the server transferring multimedia data to said at least one decoder box comprises the server performing a SCSI bus transfer.

* * * * *